(12) United States Patent
Smith et al.

(10) Patent No.: US 6,343,402 B1
(45) Date of Patent: *Feb. 5, 2002

(54) MIRROR WIPER ASSEMBLY

(76) Inventors: Darrel L. Smith, 14611 NW. 16$^{th}$ Ave., Citra, FL (US) 32113-2905; Donnie Knight, P.O. Box 11388, Tampa, FL (US) 33680

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/351,393

(22) Filed: Jul. 13, 1999

Related U.S. Application Data

(63) Continuation-in-part of application No. 08/987,113, filed on Dec. 8, 1997, now Pat. No. 6,032,323.

(51) Int. Cl.$^7$ .............................. B60S 1/438; B60S 1/44
(52) U.S. Cl. .................. 15/250.3; 15/250.4; 15/250.24; 15/250.29; 15/250.43; 359/864
(58) Field of Search ............................ 15/250.3, 250.4, 15/250.24, 250.29, 250.43; 359/864

(56) References Cited

U.S. PATENT DOCUMENTS

| | | | |
|---|---|---|---|
| 2,063,055 A | * 12/1936 | Shaw ...................... | 15/250.29 |
| 3,104,274 A | * 9/1963 | King ........................... | 359/864 |
| 3,526,920 A | * 9/1970 | Boyanich, Sr. ............. | 15/250.3 |
| 3,685,087 A | * 8/1972 | Pittman ...................... | 15/250.3 |
| 4,459,718 A | 7/1984 | Hewitt et al. | |
| 4,672,708 A | 6/1987 | Williams | |
| 5,179,758 A | 1/1993 | Smith et al. | |
| 5,353,466 A | 10/1994 | Smith et al. | |
| 5,485,650 A | * 1/1996 | Swanepoel ............... | 15/250.43 |
| 5,522,112 A | 6/1996 | Tiffany, III | |
| 5,564,156 A | * 10/1996 | Habba ...................... | 15/250.29 |

FOREIGN PATENT DOCUMENTS

| | | | |
|---|---|---|---|
| DE | 2207103 | * | 2/1972 |
| EP | 238262 | * | 9/1987 |
| FR | 1097933 | * | 7/1955 |
| GB | 444650 | * | 3/1936 |
| IT | 336243 | * | 2/1936 |

* cited by examiner

Primary Examiner—Robert J. Warden, Sr.
Assistant Examiner—Kaj K. Olsen
(74) Attorney, Agent, or Firm—Saliwanchik, Lloyd & Saliwanchik

(57) ABSTRACT

An exterior rearview mirror assembly is provided for use on a vehicle which includes a rearview mirror and a wiper assembly. The wiper assembly includes a wiper arm base located behind the mirror assembly extending over the top of the mirror to attach to a resilient wiper arm having a wiper blade. The wiper blade is shaped or sectioned to substantially mate with mirrors having multiple surfaces or surface combined flat/convex mirrors. The wiper arm base is attached to a bi-directional driver system which causes the wiper arm base to laterally transverse across the mirror assembly, which in turn drives the wiper blade across the mirror. The bi-directional driver system preferably includes a uni-directional belt system, about two pulleys, connected to the wiper arm base with a unique linkage to allow the base to traverse back and forth as the belt is driven about the pulleys. In another embodiment a bi-directional system is utilized where the direction is changed by a centrally located switch activated by the traveling wiper.

20 Claims, 13 Drawing Sheets

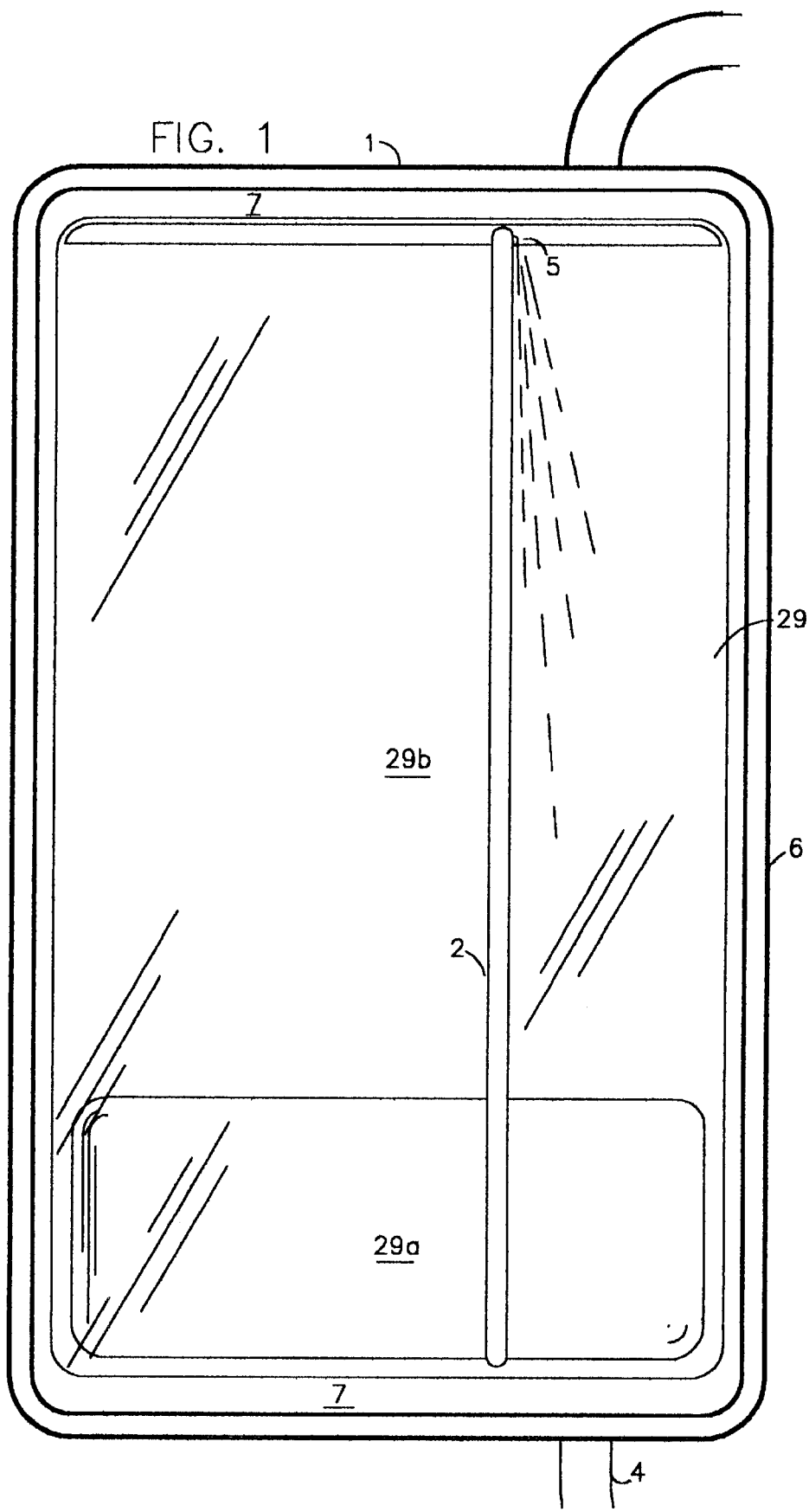

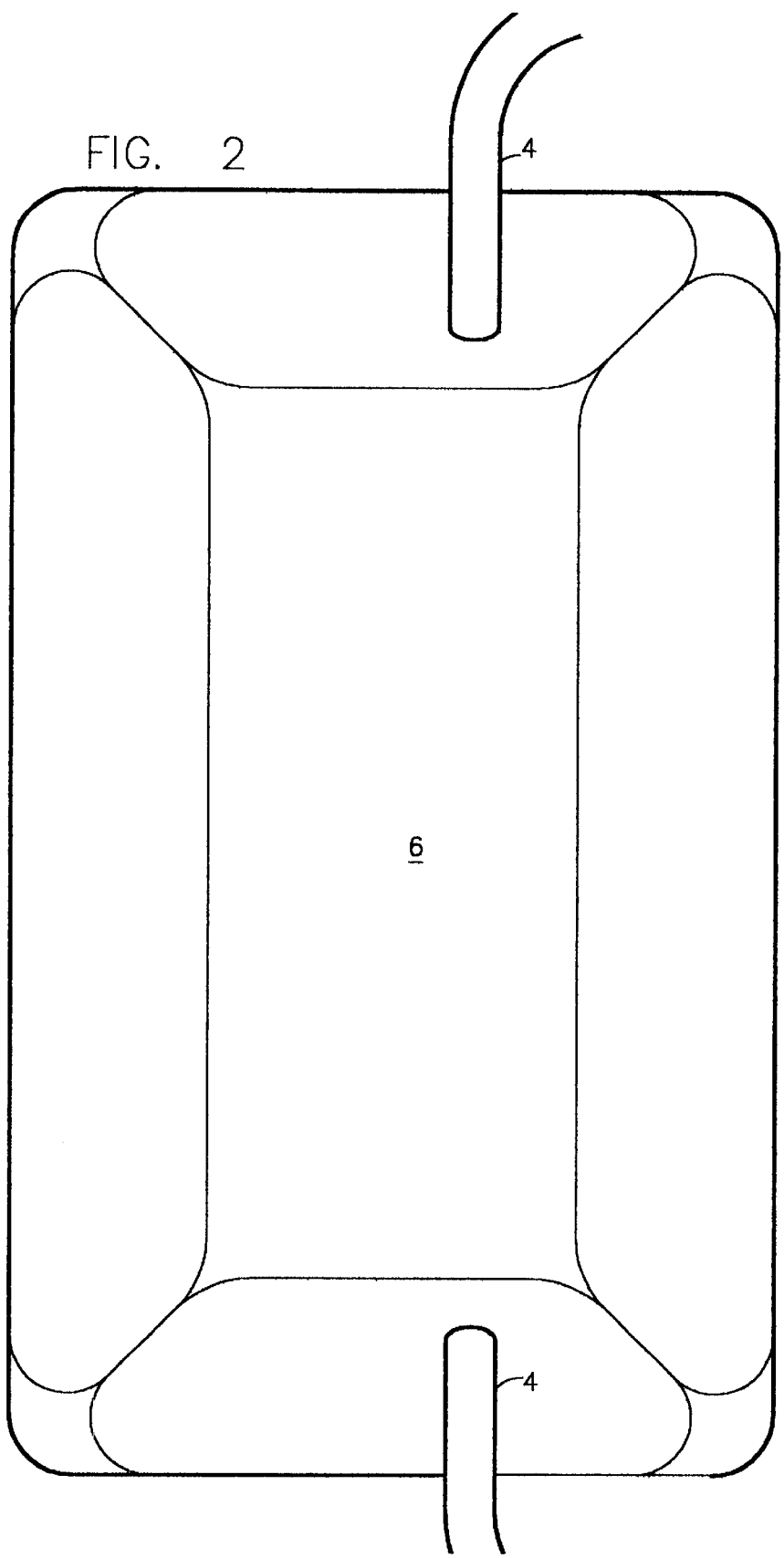

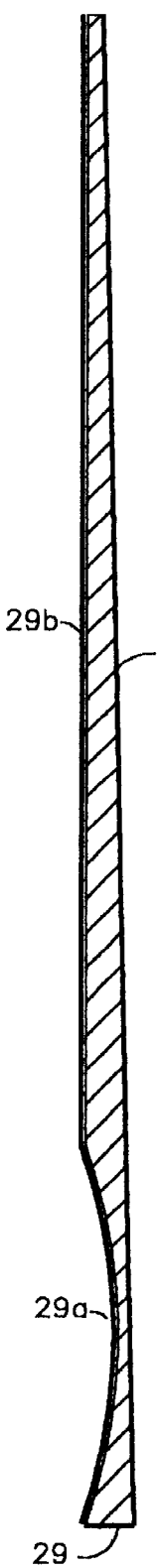
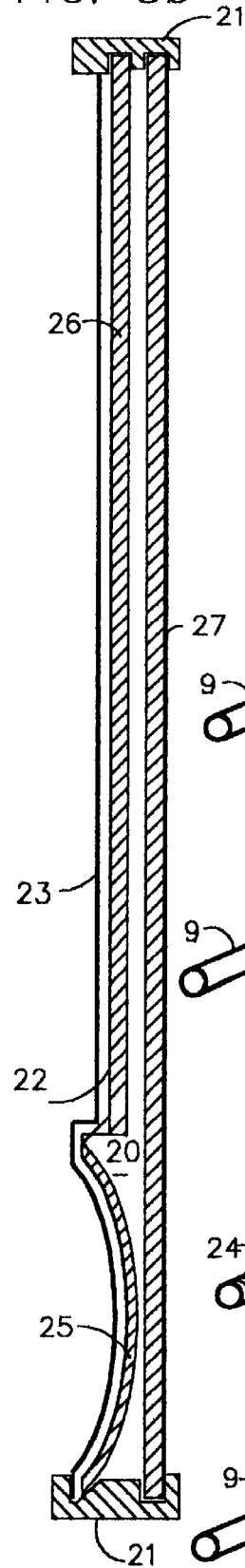
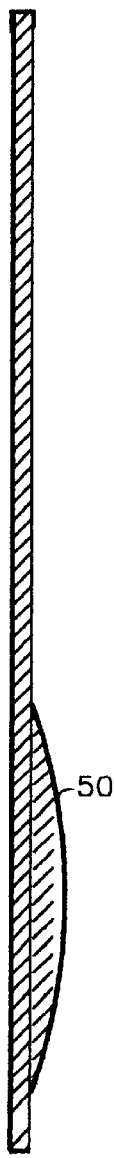
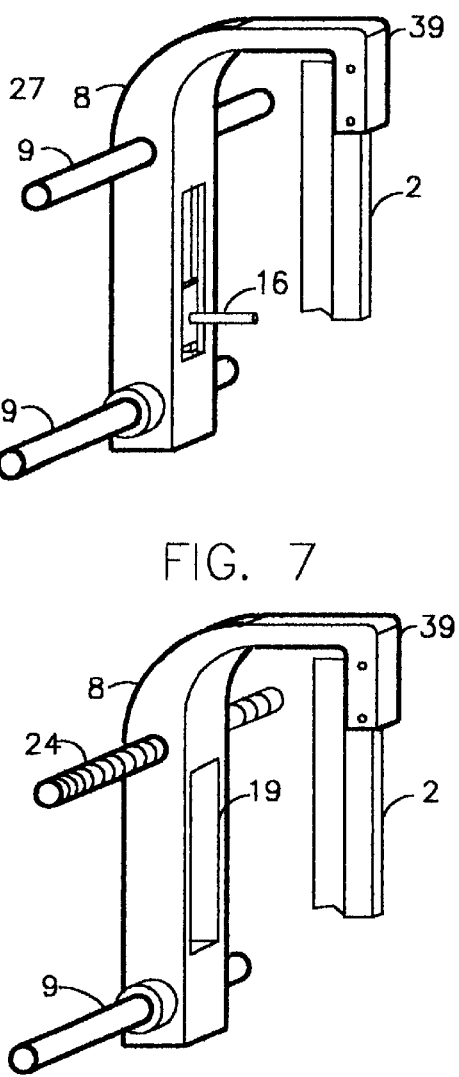

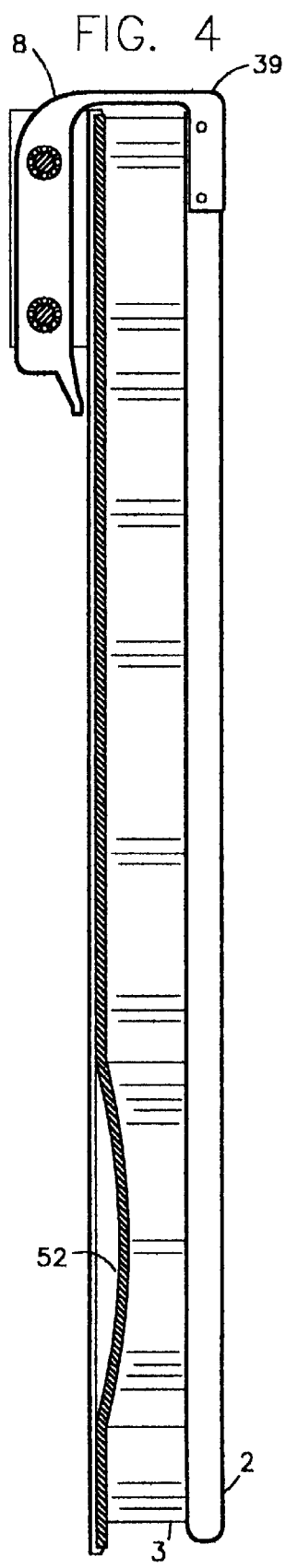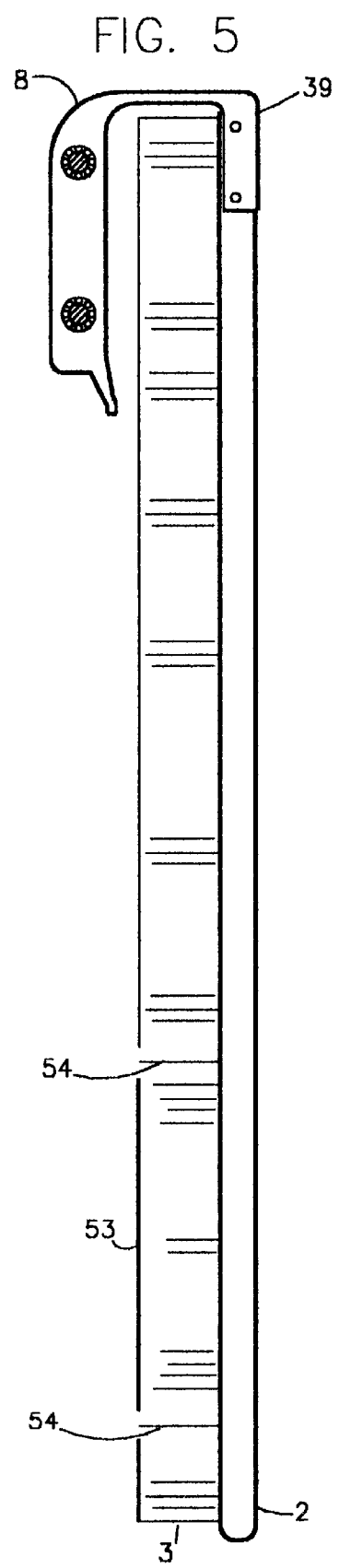

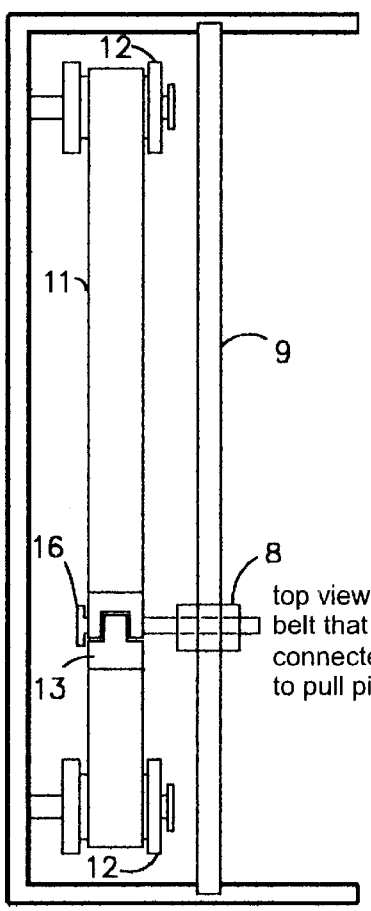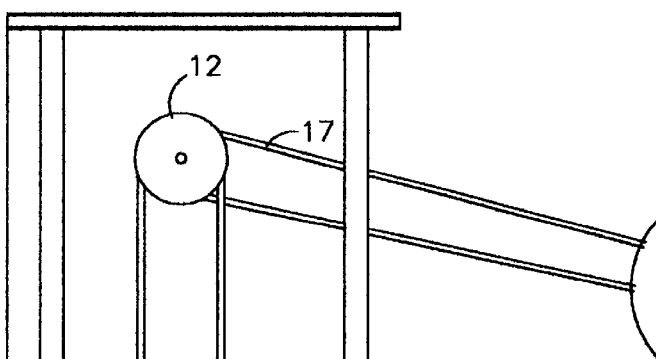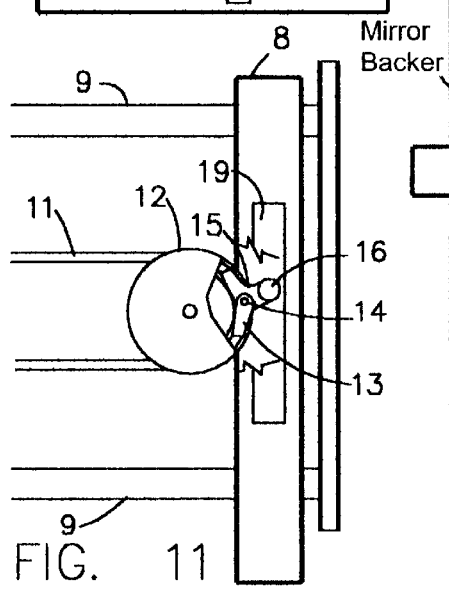

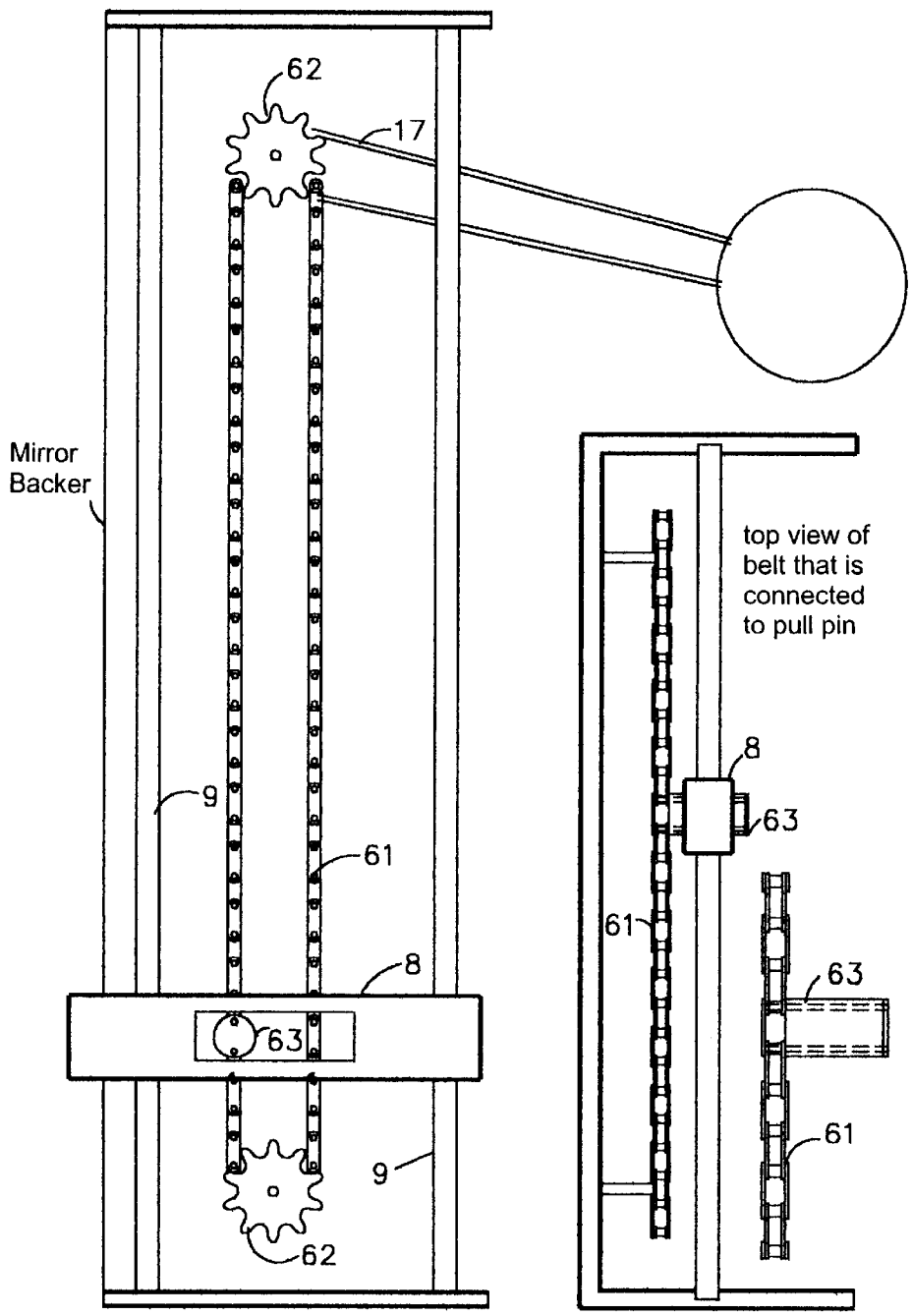

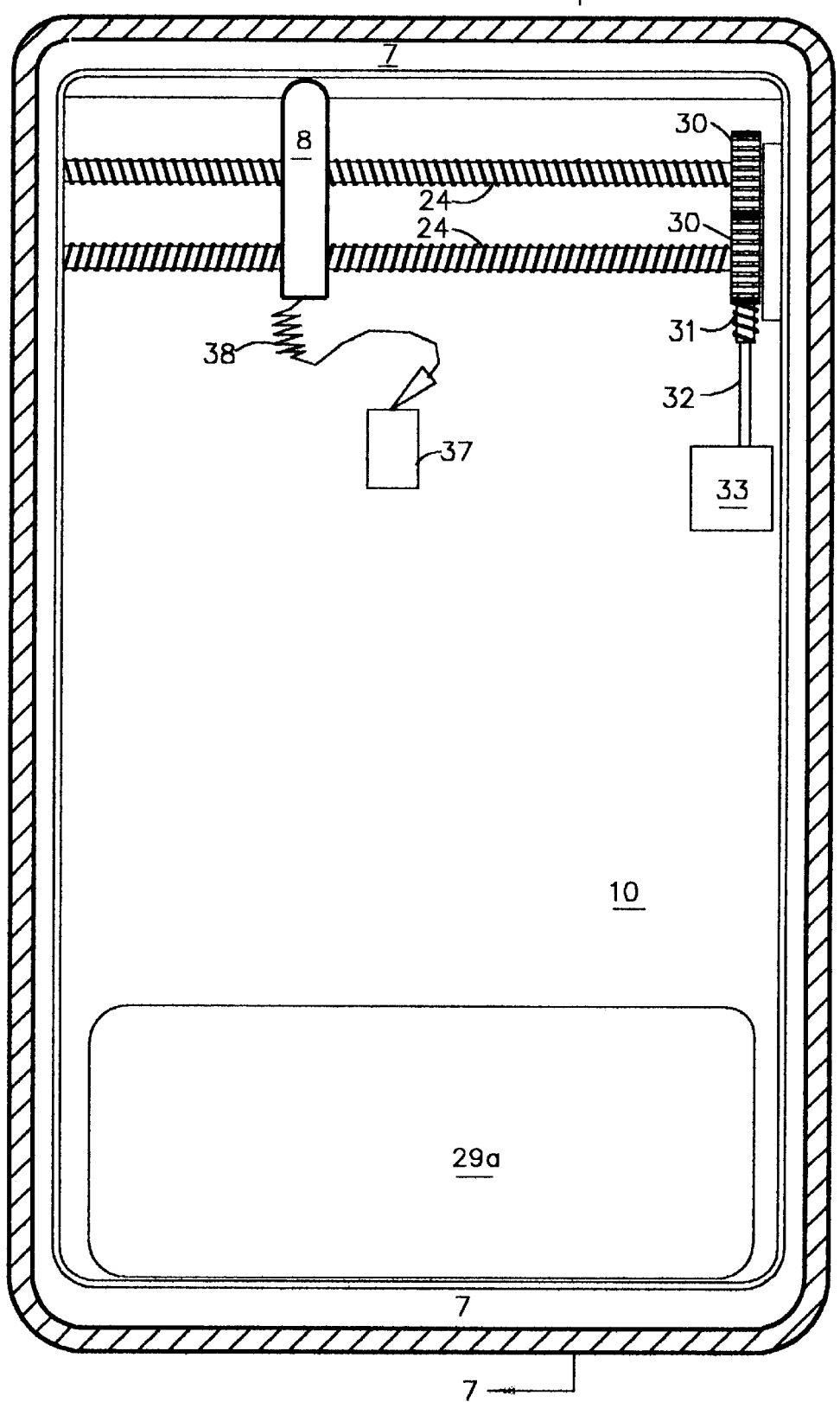

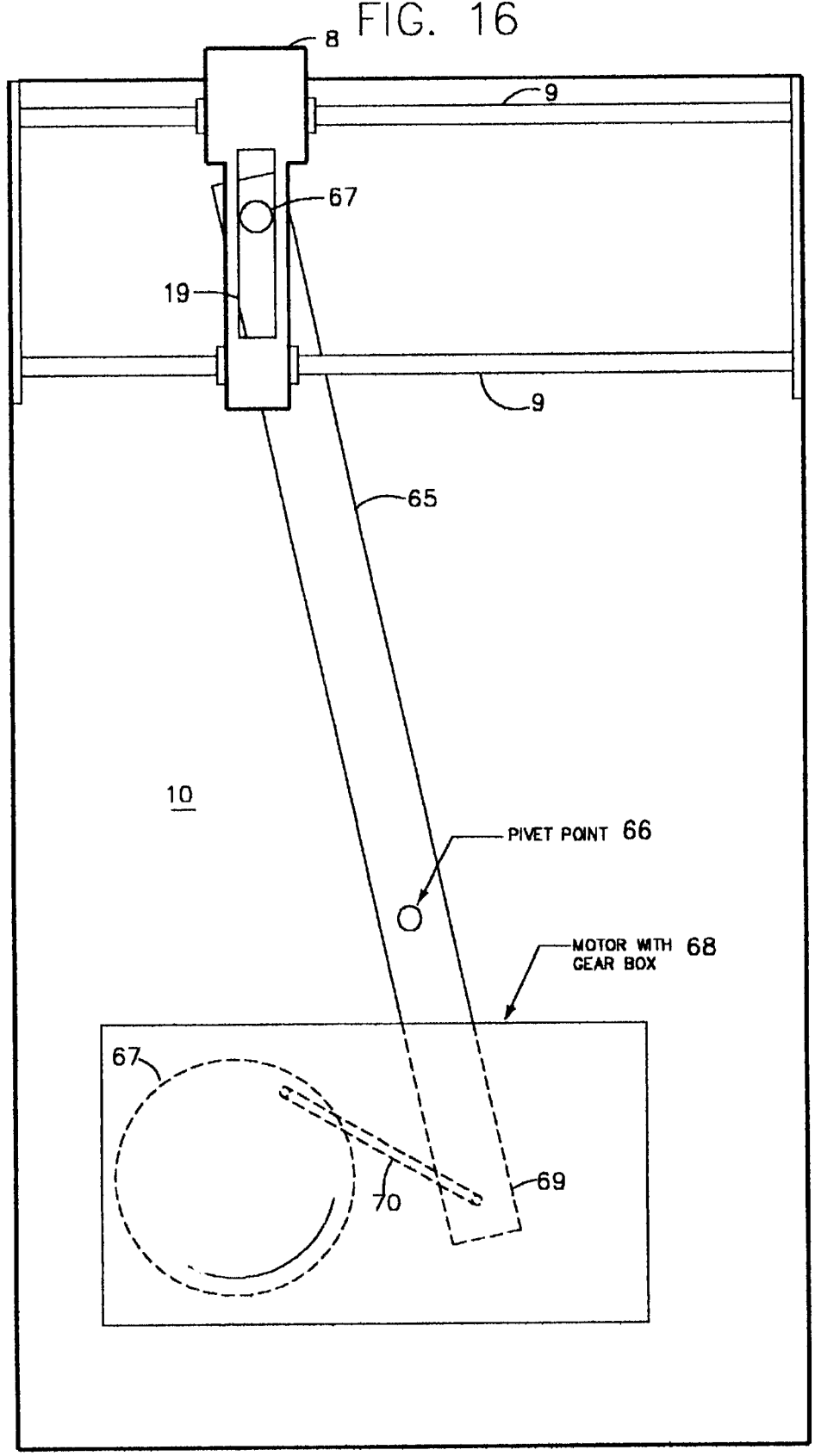

MIRROR WIPER ASSEMBLY

CROSS-REFERENCE TO A RELATED APPLICATION

This application is a continuation-in-part of patent application Ser. No. 08/987,113, filed Dec. 8, 1997 now U.S. Pat. No. 6,032,323.

BACKGROUND OF THE INVENTION

This invention relates generally to wiping and specifically to wiping of rear view mirrors of vehicles such as trucks, buses, and similar vehicles and to adjustment of mirrors.

The use of wipers on the exterior rear view mirrors of large commercial vehicles is a potential trend in the industry. Because of their length, it is especially important that trucks and buses have an excellent view of what is beside them. Unfortunately, heavy rainfall can obscure the view in a standard rear view mirror. Even a heated mirror does not help in heavy rainfall. If a dangerous circumstance suddenly presents itself in a vehicle's path, the driver might not be able to tell whether it is safe to change lanes, left or right, to avoid the danger. Therefore, having clean mirrors can prevent accidents and save lives.

Patents have been issued on various inventions related to wiping of exterior rear view mirrors. For example, U.S. Pat. No. 4,459,718 to Hewitt et al. describes a fluid pressure operated reciprocating mechanism which vertically wipes a rear view mirror. U.S. Pat. No. 4,672,708 to Williams describes a mirror wiper assembly with manually operated remote control, where operation of the remote control causes the wiper arm to move through one complete cycle. U.S. Pat. No. 5,522,112 to Tiffany, III describes a wiping mirror assembly driven by a screwelement which causes the wiper to vertically traverse the mirror. Two notable patents, U.S. Pat. No. 5,179,758 and U.S. Pat. No. 5,353,466, assigned to the assignee of the present application address some of the problems in the industry and are incorporated herein by reference.

Despite the existence of the above-noted patents there still remains inherent problems in the prior art. Specifically, convex mirrors (fish-eye mirrors) are often attached to the flat surface of the rearview mirror to provide better viewing range. However, since the prior art incorporates the use of straight wiper blades, the convex mirror attachment inhibits the use of such wiper blades to wipe both the flat and convex surfaces of the mirrors.

Another problem in the art relates to the mechanism for reversing direction of the wiper blade, i.e., the use of pairs of electrical contacts located at the extreme ends of the mirror. The pairs of electrical contacts are generally used to signal the device that drives the wiper arm when the wiper blade has reached the extreme end so that the direction of the blade can then be reversed. However, by using these pairs of contacts, the electrical system becomes more complex and subject to an increased failure rate should there be a problem with the contacts, such as corrosion, debris, or the like.

Furthermore, despite the issuance of the patents on the various inventions related to wiping of rearview mirrors, it is still a rare sight to see a vehicle equipped with any of these inventions. In the absence of regulations mandating wipers on the external rear view mirrors of large commercial vehicles, the popularity and commercial success of such wipers can be expected to be highly price sensitive.

BRIEF DESCRIPTION OF THE INVENTION

An exterior rearview mirror assembly is provided for use on a vehicle which includes a rearview mirror and a wiper assembly. The wiper assembly includes a wiper arm base located behind the mirror assembly extending over the top of the mirror to attach to a resilient wiper arm having a wiper blade. The wiper blade is shaped or sectioned to substantially mate with mirrors having uneven surfaces such as when a convex mirror is attached to the flat surface of the rear view mirror. The wiper arm base is preferably attached to a bi-directional driver system which causes the wiper arm base to laterally transverse across the mirror assembly, which in turn drives the wiper blade across the mirror. The bi-directional driver system preferably includes a uni-directional belt system, about two pulleys, connected to the wiper arm base with a unique linkage to allow the base to traverse back and forth as the belt is driven about the pulleys. In another embodiment, a bi-directional system is utilized where the direction of a pulley or other drive means is changed by a centrally located switch activated by the traveling wiper.

In one embodiment, the bi-directional driver system preferably includes a uni-directional belt system, about two pulleys. The pulley system comprises two oppositely spaced pulleys and a belt. The pulleys are located on the backside said mirror sufficiently far apart to allow the wiper blade to traverse the mirror surface, with the belt being affixed around the pulleys. The pulley system is driven by a uni-directional motor which is attached to either pulley with a drive belt. The belt necessarily rotates about the pulleys such that the belt portion on the upper turn of the pulley system travels in one direction and the belt portion on the lower turn of the pulley system travels in the opposite direction. The wiper arm base is connected to the pulley system with a unique linkage to allow the base to traverse back and forth following the upper and lower directions of the belt about the pulleys. Alternatively, the pulleys and belt can be replaced with a chain and gears.

In an alternative embodiment, the mirror assembly comprises at least one spirally threaded rod inserted through a counter-threaded hole within the wiper arm base. The threaded rod meshes into a worm gear meshed to a worm of driver thereby translating bi-directional rotation to the threaded rod, causing the wiper arm base to traverse across the mirror surface.

In another embodiment, the mirror assembly comprises a pulley assembly to which the wiper arm base is securely attached. At least one rod is inserted through the wiper arm base to maintain the wiper arm base along a straight path. The pulley system provides the lateral movement, causing the wiper arm base to traverse across the mirror surface In the two above embodiments, a switch is centrally located near the rods. The switch is affixed to the wiper arm base such that the DPDT switch is activated when the wiper arm base reaches either end of the rod. The activation of the switch causes the motor to reverse direction of the wiper arm base, periodically causing the blade to traverse back and forth across said flat outer surface in a wiping manner.

BRIEF DESCRIPTION OF THE DRAWINGS

FIG. 1 is a front view of the combined convex/flat mirror and wiper device of the present invention, hereinafter referred to as the mirror assembly.

FIG. 2 is a back view of the mirror assembly.

FIG. 3a is a cross-sectional view of a single piece mirror in one embodiment.

FIG. 3b is a cross-sectional view of a laminated glass and multi-piece mirror in an alternate embodiment.

FIG. 3c is a cross-sectional view of a single piece mirror with a convex mirror.

FIG. 4 is a side view of a shaped wiper blade.

FIG. 5 is a side view of a sectional wiper blades.

FIG. 6 is a perspective view of one embodiment of the wiper arm base.

FIG. 7 is a perspective view of one embodiment of the wiper arm with vertical slot.

FIG. 9 is a top view of belted pulley assembly.

FIG. 10 is a front view of the timing belt wiper arm attachment.

FIG. 11 is a zoomed front view of the timing belt wiper arm attachment.

FIG. 12a is a front view of a chain wiper arm attachment.

FIG. 12b is a top view of the chain wiper arm attachment.

FIG. 12c is a zoomed view of the chain wiper arm attachment.

FIG. 13 is a back view of the switching mirror assembly with threaded bars and worm gear embodiment.

FIG. 16 is a back view of an alternative uni-directional drive means.

DETAILED DISCLOSURE OF THE INVENTION

Figure 8:
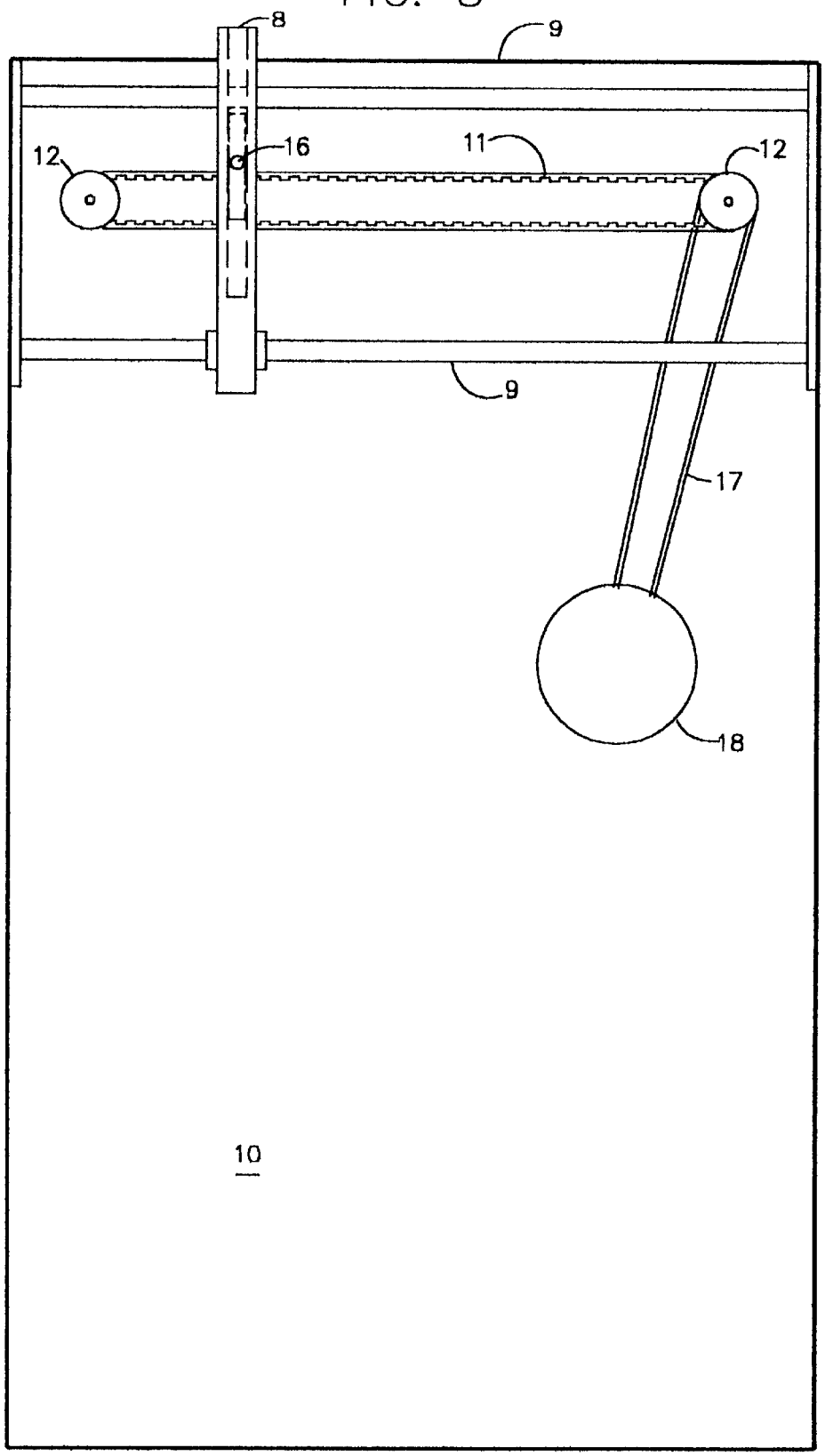
FIG. 8 is a back view of the mirror assembly with the back cover removed.

Turning now to FIG. 1 wherein like numerals represent like elements throughout several views, the mirror assembly 1 of the present invention is shown. The mirror assembly is designed for use external to the vehicle such as a truck or bus, and may be attached to either or both sides with arm supports 4. Since the mirror assembly 1 is external to the vehicle, it is subject to environmental conditions such as rain, dirt, dust and road debris. The mirror assembly includes a wiper arm 2 to clean the exterior surface 29 of the mirror assembly 1. A sprayer 5 for spraying water or another cleaning solution may be located on an upper portion of the wiper arm 2. The sprayer 5 may tap off the window washer fluid system already present under the hood of most vehicles. The driver sprays the mirror whenever desired. At the manufacturer's option, the windshield washer control can activate the rearview mirror sprayer also. This eliminates the need for separate pumps and controls. Otherwise, a separate pump and control can be provided. The wiper arm 2 has attached along its length between the arm 2 and the mirror surface 29 a wiper blade 3 or squeegee.

FIG. 1 shows the preferred mounting of the wiper, vertically. However, alternate mounting positions, such as horizontally are contemplated herein. One advantage of having the wiper arm 2 mounted vertically, as shown, is that gravity will cause rain water to run down the length of the wiper blade 3. The water automatically gets out of the way. Another advantage of a vertically mounted wiper arm 2 is that when it blocks one eye's view, the other eye can often see around it. The wiper arm 2 is designed to move along a straight path. It will move horizontally from side to side if mounted vertically or move vertically from top to bottom if mounted horizontally. Water stoppers 7 are located along the inside edge of the cover 6 (FIG. 2) and extend to the outer edge of the mirror 29.

Turning now to FIG. 3a, in one embodiment, the mirror 29 is a single piece of reflective surfacing made of glass or other materials which are translucent with reflective backing or are entirely reflective in nature. The mirror 29 has combined a flat surface 29b for reflecting a normal image and a convex surface 29a which curves outward to provide a wide-angle reflective surface along its back side. The mirror 29 has a continuous flat face 29c along the front, exposed side. The continuous flat face 29c on the exposed side may be easily and thoroughly cleaned by the wiper blade 3 since there are no pockets, indentations or seams between the flat surface 29c and the convex surface 29a.

In another embodiment shown in FIG. 3b, a multi-piece mirror assembly 20 is shown. This embodiment comprises a flat mirror 26 and a convex mirror 25 along the same vertical plane with a single piece of translucent face material 27 such as glass extending over both mirrors to provide a flat face 27 on the exposed side. This assembly may be laminated. A seal 21 of plastic, rubber or like material is located around the outer edges of both the mirrors 25, 26 and glass face 27 to prevent water or moisture from entering between the glass 27 and the mirrors 25, 26. A heating element 22 may be attached to the back of the mirror(s) 29, 20 for defrosting and defogging.

In a third embodiment shown in FIG. 3c, a mirror assembly with a attached convex portion 50 is shown. The convex portion can be attached with adhesive or integrated as a single unit. As a result of the convex portion 50, the wiper blade 3 may lose contact with the surface of the mirror 29. Referring to FIG. 4, in order to prevent the loss of contact, the wiper blade 3 is shaped to matched the arc of the convex portion 50. The shaped wiper blade 52 is able to travel over the convex portion 50 and the mirror 29 without losing contact with either surface. The wiper blade 3 can be shaped either in production or by the end user, by providing a template for cutting the wiper blade 3 with the appropriate arc and in the appropriate location.

In another embodiment as shown in FIG. 5, the wiper blade 3 is sectionally cut 54 to form a sectional flap 53. The sectional flap 53 is the height of the convex portion 50, allowing the wiper blade 3 to travel over the convex portion 50 and the mirror 29 without losing contact with either surface. The wiper blade 3 can be cut either in production or by the end user, by providing a template for cutting the wiper blade 3 with the appropriate height and in the appropriate location. The flexible blade can be shaped to mate with both surfaces and sectionally cut to maintain contact with both surfaces.

Additionally, mirror 29 can be affixed with multiple convex portions 50. Subsequently, the wiper blade 3 would be shaped with multiple arcs corresponding to the multiple convex portions 50. The shaping of the wiper blade 3 can be accomplished utilizing either method, shaping or cutting.

Turning now to FIGS. 6 and 7, the wiper arm base 8 is shown. Extension 39 connects the wiper arm base 8 to the wiper arm 2. The wiper arm base 8 includes at least one hole, preferably two, through which threaded rods 24 and non-threaded control rods 9 may be inserted or a combination thereof. The wiper arm base 8 extends over the top of the mirror 29 (or 20) such that extension 39 is exterior to the assembly for securing the wiper arm 2 against the exposed side of the mirror.

Figure 17B:
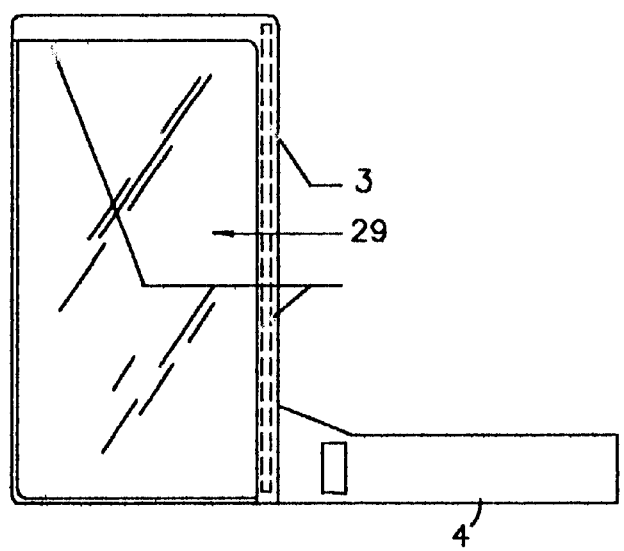
FIG. 17b is a front view of the mirror assembly with a offset wiper arm base.
Figure 17C:
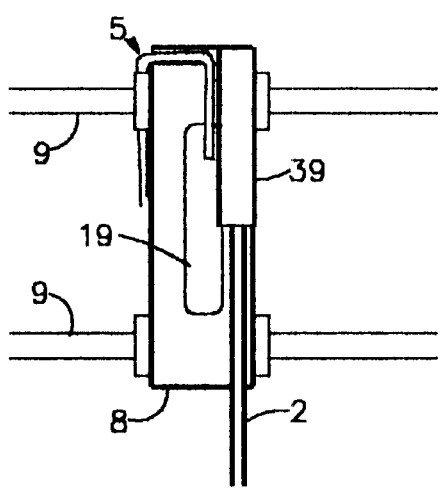
FIG. 17c is a front view of offset wiper arm base
Figure 17A:
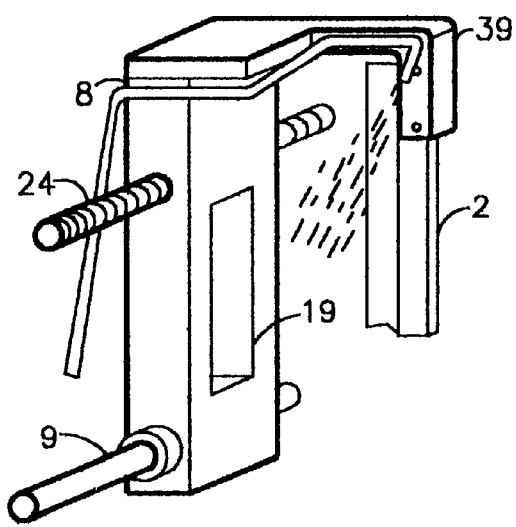
FIG. 17a is a perspective view of offset wiper arm base.

In an alternative embodiment of the wiper arm base 8, as shown in FIG. 17a, extension 39 is offset from the vertical axis of the wiper arm base 8. The extension 39 is offset to one side of the wiper arm base 8 such that the wiper blade 3 is also off set to one side of the mirror 29 (or 20) when the wiper blade 3 is not in use, as shown in FIG. 17b. The offset extension 39 configuration provides for an unobstructed view of the mirror 29 (or 20) when the wiper blade 3 is not in use.(e.g., in a "parked" position).

Turning now to FIG. 8, the inner workings of the mirror assembly are shown from the back with the back cover 6 removed. The back side 10 of the mirror assembly is preferably made of tin or other suitable material. The wiper arm base 8 is located near the top of the assembly. Two control rods 9 extending horizontally across the assembly run through the wiper arm base 8. Preferably, two rods 9 are utilized to help stabilize the wiper arm base 8, although other arrangements are contemplated herein. Two oppositely spaced pulleys 12 are located on the backside 10 of the mirror with a belt 11 affixed around the pulleys 12. The belt 11 is driven in a single direction about the pulleys 12, wherein the portion of the belt traversing the upper turn of the pulleys travels in one direction and the portion of the belt traversing the lower turn of the pulleys necessarily travels in the opposite direction. The wiper arm base is connected to the belt 11 utilizing a unique linkage so that the wiper arm base will move laterally in one direction when traveling along the portion of the belt traversing the upper turn of the pulleys and will move laterally in the opposite direction when traveling along the portion of the belt traversing the lower turn of the pulleys. The vertical spacing between the upper and lower portions of the belt about the pulley does not cause any reciprocal vertical movement of the wiper arm base with the unique linkage as described hereafter. The directional orientation language used herein is contemplated to be appropriately altered should the wiper arm be mounted to provide vertical rather than horizontal wiping.

The unique linkage is provided by a pinned joint 13 attached to a point along the belt 11. Referring to FIGS. 9–11, the pinned joint 13 swivels about a connection pin 14, enabling the pinned joint 13 to rotate about the pulleys 12. The pinned joint 13 also includes an offset coupler 15. The offset coupler 15 is offset from the belt 11 to allow for the attachment of the wiper arm base 8. The wiper arm base 8 is affixed (FIG. 9–11) to the belt 11 by inserting the attachment pin 16 through the wiper arm slot 19 into the offset coupler 15. The wiper arm slot 19 allows the attachment pin 16 to slide vertically within the wiper arm base 8 to prevent vertical movement of the wiper arm base as its point of connection moves about the upper portion of the pulleys and the lower portion of the pulleys. This arrangement allows the wiper arm base 8 to periodically change longitudinal (horizontal) direction, as the attachment pin 16 rotates about pulleys 12. During rotation upon reaching one of the pulleys, the longitudinal force will decrease and the attachment pin 16 will begin to slide vertically within the wiper arm slot 19. Eventually the longitudinal force will change direction until reaching the other pulley where the process repeats. This arrangement allows the wiper blade 3 to traverse back and forth across the mirror surface 29.

In an alternative embodiment, as shown in FIG. 12a, the belt 11 and pulley 12 are replaced with a chain 61 and sprockets 62. The attachment pin 63 is affixed to a link in chain 61. The wiper arm base 8 is affixed to the chain 61 by inserting the attachment pin 63 through the wiper arm slot 19. The wiper arm slot 19 allows the attachment pin 63 to slide vertically within the wiper arm base 8 to prevent vertical movement of the wiper arm base as its point of connection moves about the upper portion of the sprockets 62 and the lower portion of the sprockets 62. This arrangement allows the wiper arm base 8 to periodically change longitudinal (horizontal) direction, as the attachment pin 63 rotates about gears 62. During rotation upon reaching one of the gears 62, the longitudinal force will decrease and the attachment pin 63 will begin to slide vertically within the wiper arm slot 19. Eventually the longitudinal force will change direction until reaching the other gear 63 where the process repeats. This arrangement allows the wiper blade 3 to traverse back and forth across the mirror surface 29.

Returning to FIG. 8, power is provided to the wiper blade 3 by attaching a drive belt 17 between the drive motor 18 and either pulley 12 or sprocket 62. The pulley system is affixed to the back side 10 of the mirror. This system allows the wiper arm base 8 to traverse back and forth without having to change direction of the motor 18 and no electrical contacts are necessary as in the prior art.

In a second embodiment, as shown in FIG. 13, one or both of these rods 9 may be spirally threaded rods 24. Preferably, two rods 9 are utilized to help stabilize the wiper arm base 8. The threaded rods 24 mesh into a wheel with marginal teeth, e.g., worm gear 30. The worm gear 30 and threaded rods 24 drive the wiper arm base 8. The worm gear 30 is attached to another spirally threaded shaft (worm 31) attached to a shaft 32 and motor 33 or other driving means. As the motor 33 drives the worm 31 into the worm gear 30, the threaded rods 24 cause the wiper arm base 8 to move horizontally across the mirror assembly.

Figure 14:
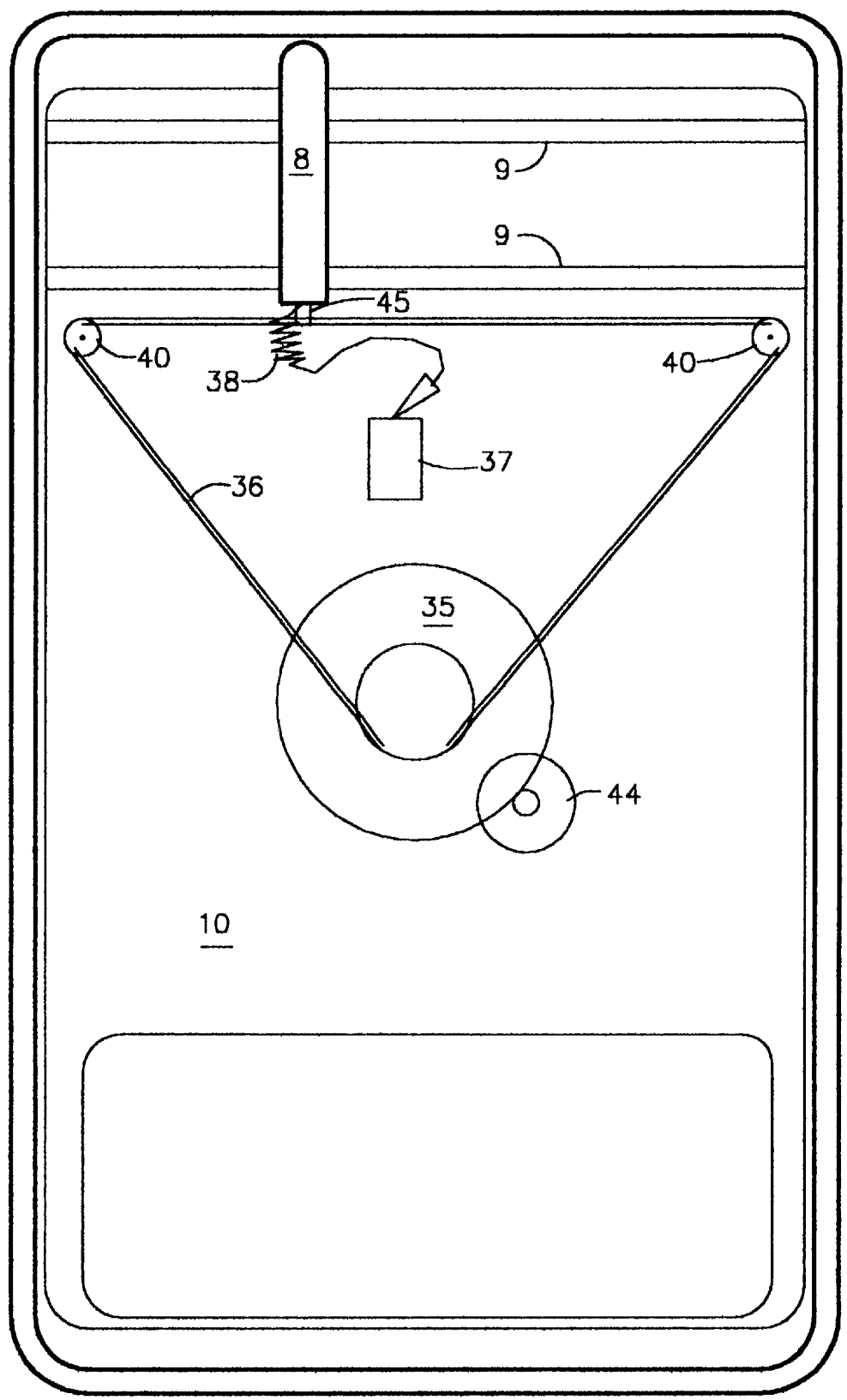
FIG. 14 is a back view of the switching mirror assembly with a belt and pulley system embodiment.

FIGS. 14 show an alternate pulley assembly for driving the wiper arm base 8. A plastic gear 35 is provided with both belt teeth and gear teeth making it a bitooth gear. The timing belt 36 runs through the gear 35 and around two oppositely spaced pulleys 40. Motor 44 drives gear 35 which drives the timing belt 36. The pulley assembly is connected to the backside 10 of the mirror. The timing belt 36 is attached to the wiper arm base 8 by a connector 45. As the timing belt 36 moves back and forth, the wiper arm base moves across the rods 9 which causes the wiper arm 2 and blade 3 to wipe the exposed surface of the mirror.

In the above embodiments, the wiper motor 33 (or 44) is a bi-directional direct current motor. It is powered by a direct current electric power control that periodically changes polarity. Each change in polarity causes a change in the direction of the wiper's motion and begins a new half cycle. A switch, such as a double pole double throw (DPDT) switch, 37 (FIG. 13 and 14) is centrally mounted to the backside 10 of the mirror for changing polarity, thereby changing direction of the motor 33 (or 44) and wiper arm base 8. Alternatively, a single pole double throw switch or other switching devices can be used. A distance limiter 38, such as a spring or other elastic member, is mounted between the DPDT switch 37 and the wiper arm base 8. To activate the DPDT switch 37, the wiper arm base 8 travels to either end of the control rods 9 reaching the end of the range of motion of the distance limiter 38. In addition to activating the DPDT switch 37, the distance limiter 38 may also act as a shock absorber, absorbing the energy in the wiper arm base 8 to decrease the velocity as the wiper arm base 8 changes the direction of motion and to prevent damage to the switch. Examples of the distance limiter 38 include, but are not limited to, a tension spring, a wire cable, an elastic or flexible line, or the like. In this embodiment the DPDT switch 37 can act directly to change the direction of the motor 33 (or 44) or alternatively act as a motion stop. When directly changing the direction of the motion, the activation of the DPDT switch 37 changes the polarity causing the motor 33 (or 44) to change direction. When acting as a stop, as the wiper arm base 8 reaches the ends of the control rods 9 triggering the DPDT switch 37.

Figure 15:
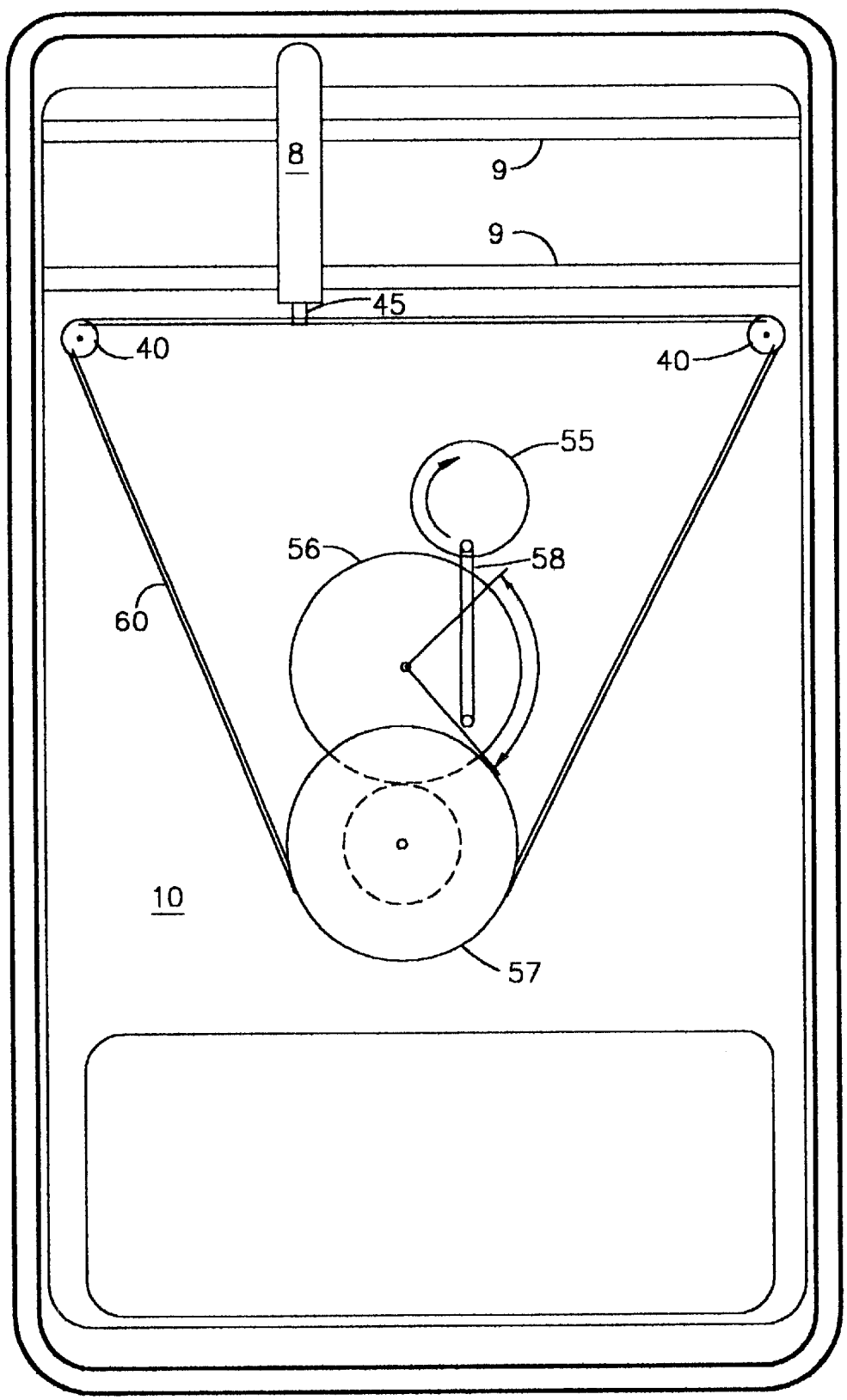
FIG. 15 is a back view of a alternative pulley system with a uni-directional motor.

FIG. 15 depicts a third embodiment of an alternative pulley assembly for driving the wiper arm base 8. The timing belt 60 runs through the bitooth gear 57 and around two oppositely spaced pulleys 40. The bitooth gear 57 is provided with both belt teeth and gear teeth. A drive gear 56 engages the gear teeth of the bitooth gear 57. A shaft 58 is pivotally attached to the drive gear 58, offset from the central axis of rotation of the drive gear. Similarly, the opposite end of shaft 58 is pivotally attached to a uni-directional motor 55, offset from the central axis of rotation of the motor. The rotation of the uni-directional motor and gear 55 causes the shaft 58 to rotate the drive gear 56. The drive gear 56 in turn rotates the bitooth gear 57, causing the belt 60 to drive the wiper arm base 8 across the mirror 29. The offset attachment of the shaft 58 to the motor gear 55 and drive gear 56 cause the drive gear 56 to periodically change rotational direction. The drive gear 56 will change rotational direction every half cycle of rotation of the motor gear 55. The periodic change in direction every half cycle will cause the wiper arm base 8 to horizontally traverse the wiper arm 2 and wiper blade 3 back and forth across the mirror face 29 every full cycle.

In an alternative embodiment, as shown in FIG. 16, a rocker arm 65 drives the wiper arm base 8 horizontally across the mirror face 29. The top end of the rocker arm 65 is pinned 67 to the wiper arm slot 19, such that the pin 67 can slide vertically within the wiper arm slot 19. The bottom end 69 of the rocker arm 65 attached to a drive motor 68. The drive motor 68 is mounted to the mirror assembly, such that the fly wheel 67 is offset from the central vertical axis. One end of shaft 70 is pivotally attached to the fly wheel 67, offset from the fly wheel's 67 central axis of rotation. The opposite end of the shaft 70 is pivotally attached to the bottom end 69 of the rocker arm 65. The rocker arm 65 is pivotally attached to the mirror assembly at a pivot point 66, such that as the drive motor 68 drives the fly wheel 68 the rocker arm 65 will pivot about the pivot point 66, causing the wiper arm base 8 to horizontally travers the mirror face 29. The offset attachment of the shaft 70 to the fly wheel 67 causes the rocker arm 65 to periodically change the rotational direction about the pivot point 66. The rocker arm 65 will change rotational direction every half cycle of rotation of the fly wheel 67. The periodic change in direction every half cycle will cause the wiper arm base 8 to horizontally travers the wiper arm 2 and wiper blade 3 back and forth across the mirror face 29 every full cycle.

Figure 18A:
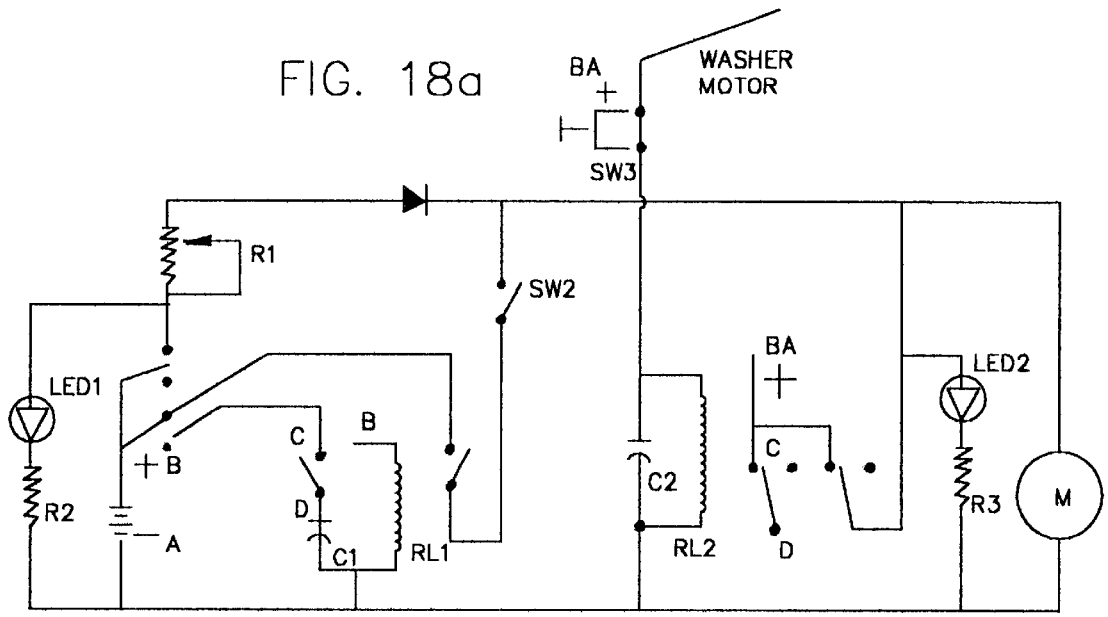
FIG. 18a depicts a schematic diagram of the wiper control system.
Figure 18B:
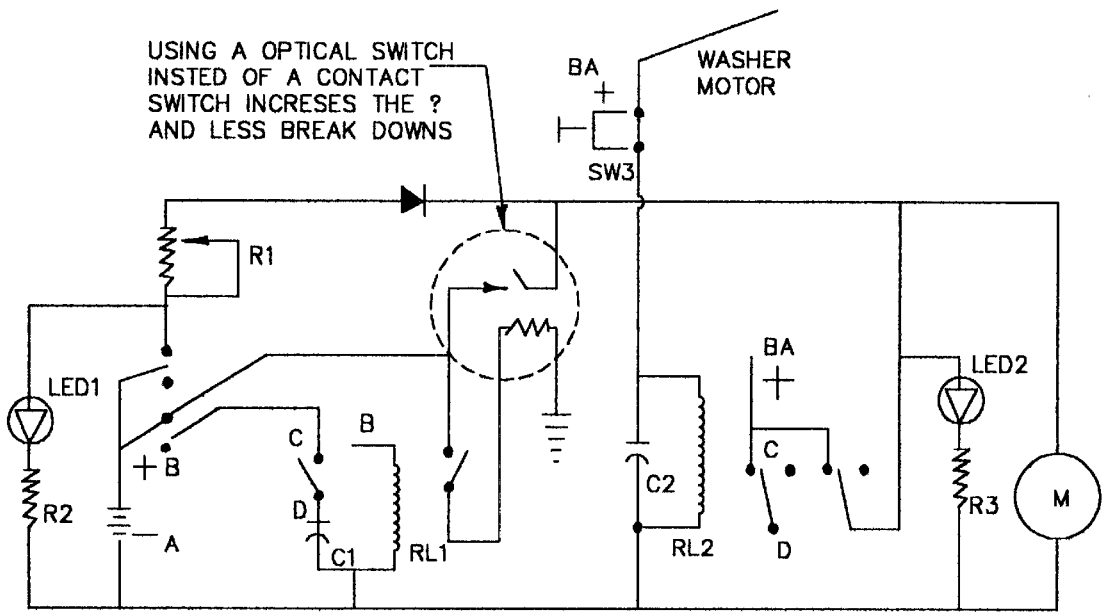
FIG. 18b depicts an alternative embodiment of the wiper control system.

A schematic diagram for the control system is depicted in FIGS. 18*a* and 18*b*.

What is claimed is:

1. An exterior rearview mirror assembly for use on a vehicle, comprising, in combination:
    a rearview mirror having at least one flat reflective surface and at least one convex reflective surface;
    a wiper assembly attached to said rearview mirror having a wiper arm base located substantially behind said mirror and extending over a top edge of said mirror to engage a top edge of a substantially resilient wiper arm;
    a shaped flexible blade disposed along the length of said wiper arm base, said shaped blade being sectionally cut to allow said wiper blade to substantially mate with both said flat surface and said convex surface; and,
    a drive means, wherein said wiper arm base is attached to said drive means for bi-directionally driving said wiper blade across said reflective surfaces.

2. The mirror assembly of claim 1, wherein said drive system comprises a pair of oppositely spaced sprockets and a chain, wherein said chain is affixed around said sprockets.

3. The mirror assembly of claim 1, wherein said wiper arm base engages said top edge of said substantially resilient wiper arm in an offset.

4. The mirror assembly of claim 1, wherein said drive system comprises a pair of oppositely spaced pulleys and a belt, and wherein said belt is affixed around said pulleys.

5. The mirror assembly of claim 1, wherein a water stopper is affixed along the inside edge of said mirror and extending to the outer edge of said mirror.

6. The mirror assembly of claim 1, wherein a fluid sprayer is affixed to said wiper arm for applying fluid to said reflective surface of said rearview mirror.

7. An exterior rearview mirror assembly for use on a vehicle, comprising, in combination:
    a rearview mirror having at least one flat reflective surface and at least one convex reflective surface;
    a wiper assembly attached to said rearview mirror having a wiper arm base located substantially behind said mirror and extending over a top edge of said mirror to engage a top edge of a substantially resilient wiper arm;
    a shaped flexible blade disposed along the length of said wiper arm base, said shaped blade being sectionally cut to allow said wiper blade to substantially mate with both said flat surface and said convex surface;
    a water stopper affixed along the inside edge of said mirror and extending to the outer edge of said mirror; and,
    a drive means, wherein said wiper arm base is attached to said drive means for bi-directionally driving said wiper blade across said reflective surfaces.

8. The mirror assembly of claim 7, wherein said wiper arm base engages said top edge of said substantially resilient wiper arm in an offset.

9. The mirror assembly of claim 7, wherein said drive system comprises a pair of oppositely spaced pulleys and a belt, and wherein said belt is affixed around said pulleys.

10. The mirror assembly of claim 7, wherein said drive system comprises a pair of oppositely spaced sprockets and a chain, wherein said chain is affixed around said sprockets.

11. The mirror assembly of claim 7, wherein a fluid sprayer is affixed to said wiper arm for applying fluid to said reflective surface of said rearview mirror.

12. An exterior rearview mirror assembly for use on a vehicle, comprising, in combination:
    a rearview mirror having at least one flat reflective surface and at least one convex reflective surface;
    a wiper assembly attached to said rearview mirror having a wiper arm base located substantially behind said mirror and extending over a top edge of said mirror to engage a top edge of a substantially resilient wiper arm;
    a shaped flexible blade disposed along the length of said wiper arm base, said shaped blade being sectionally cut to allow said wiper blade to substantially mate with both said flat surface and said convex surface;
    a fluid sprayer affixed to said wiper arm for applying fluid to said reflective surface of said rearview mirror; and,
    a drive means, wherein said wiper arm base is attached to said drive means for bi-directionally driving said wiper blade across said reflective surfaces.

13. The mirror assembly of claim 12, wherein said wiper arm base engages said top edge of said substantially resilient wiper arm in an offset.

14. The mirror assembly of claim 12, wherein said drive system comprises a pair of oppositely spaced pulleys and a belt, and wherein said belt is affixed around said pulleys.

15. The mirror assembly of claim 12, wherein said drive system comprises a pair of oppositely spaced sprockets and a chain, wherein said chain is affixed around said sprockets.

16. The mirror assembly of claim 12, wherein a water stopper is affixed along the inside edge of said mirror and extending to the outer edge of said mirror.

17. The mirror assembly of claim 12, wherein said fluid sprayer is in communication with and part of the windshield washer system.

18. The mirror assembly of claim 12, wherein the fluid sprayer system is independent of the windshield washer system.

19. The mirror assembly of claim 12, wherein the controls of said fluid sprayer are independent of the windshield washer system controls.

20. The mirror assembly of claim 12, wherein the controls of said fluid system are integrated with the windshield washer system controls.

* * * * *